May 17, 1932.     W. E. JOHN     1,858,670
MANUFACTURE OF MEANS FOR PRODUCING A STRAIGHT LINE MOTION OF
LENSES IN CINEMATOGRAPH APPARATUS OR OF OTHER OBJECTS
Filed Oct. 16, 1931
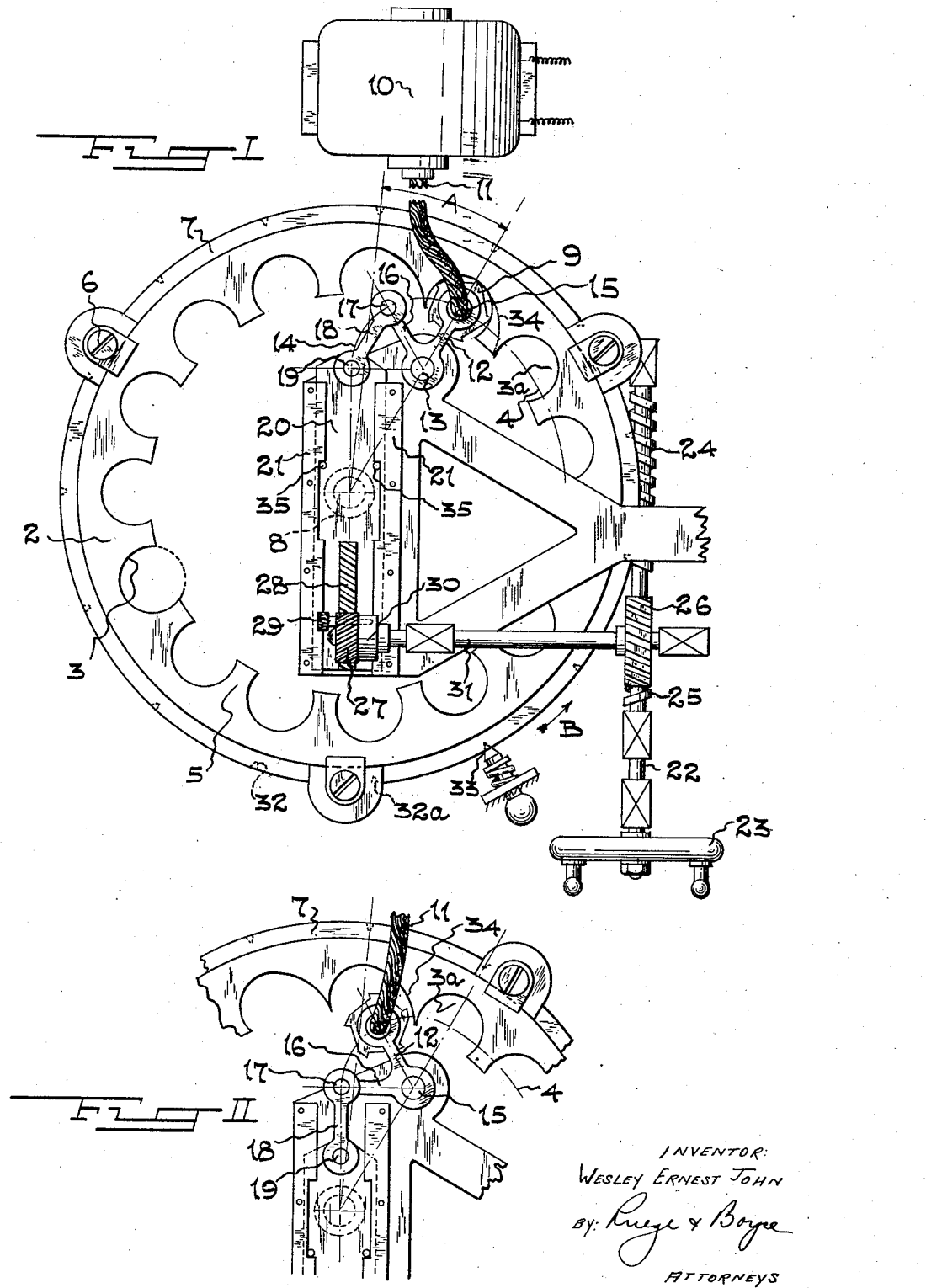
INVENTOR:
WESLEY ERNEST JOHN
BY: Rueje & Boyce
ATTORNEYS Patented May 17, 1932

1,858,670

UNITED STATES PATENT OFFICE

WESLEY ERNEST JOHN, OF JOHANNESBURG, TRANSVAAL, UNION OF SOUTH AFRICA

MANUFACTURE OF MEANS FOR PRODUCING A STRAIGHT LINE MOTION OF LENSES IN CINEMATOGRAPH APPARATUS OR OF OTHER OBJECTS

Application filed October 16, 1931, Serial No. 569,130, and in Great Britain August 27, 1930.

The present invention relates to apparatus such as that described in the specification of Patent No. 1,768,772 in which a series of cylindrical bodies such as lens carriers, is circulated through a closed path comprising an internally pocketed and toothed wheel, a rectilinear guide which is on a chord and preferably a diameter of said wheel, and curved transition guides by which the bodies are transported from the wheel into the rectilinear guide, and back from the rectilinear guide to the wheel; the bodies in the rectilinear guide moving with a constant linear velocity relatively to the angular velocity of the wheel.

The movement of the bodies is derived from the wheel in two ways. Those bodies which are in the pockets of the wheel are thereby directly carried around the arc of the wheel which forms a portion of the closed path. As each body passes from said arc and through the transition guide, which feeds the rectilinear guide, it is propelled by a tooth of the wheel, and pushes before it a series of bodies which are in actual contact with one another on their cylindrical surfaces, said series including those in the rectilinear guide; so that the latter receive their motion from the wheel through the intermediary of the wheel teeth and the bodies interposed between them and said teeth.

The object of the invention is to form the tooth surfaces of the wheel cheaply and by a simple method, but so that they will cause the bodies in the rectilinear guide to move at a velocity having a very accurate correspondence with that of the toothed wheel.

According to this invention there is provided a wheel blank in which equally spaced holes, of the diameter of the loose bodies, have been drilled around the pitch circle to form the tooth pockets; and from which the centre portion has been removed so as to cut into said holes and leave blank teeth between the holes, from which the tooth surfaces are to be formed. The plate is then mounted centrally upon a revolving table, and the tooth surface is cut on each tooth blank, by a rotary cutting tool, of the same diameter as the loose bodies, and arranged to move through an arc equivalent, as regards its position relatively to the wheel, to that of the transition guide which conveys the bodies from the driving wheel to the rectilinear path, while the driving wheel is simultaneously rotated about its centre through an arc equal in extent to that through which it would rotate while one of the loose bodies traverses the said transition guide in contact with the tooth.

The invention further consists in effecting or controlling the arcuate movement of the cutting tool by means of a slide, mounted for rectilinear movement equivalent relatively to the wheel blank to that of the bodies in the rectilinear guide aforesaid, and so moved that the velocity ratio of its linear movement to the angular movement of the table equal to $$\frac{\text{Diameter of the loose bodies}}{\text{Angular pitch of the pockets in the wheel}}.$$

One form of apparatus embodying the invention is shown in the accompanying drawings, in which—

Fig. I is a plan view showing the apparatus in position to begin the formation of a tooth driving surface, and Fig. II shows a portion of the Fig. I mechanism when the driving surface has been completed.

2 is the driving wheel blank in which pockets are formed prior to setting it in the illustrated mechanism, by boring out holes 3 equal in diameter to the loose bodies which are to be circulated, said holes being evenly spaced around the pitch circle 4 of the wheel. The centre portion of the wheel blank is then removed leaving between the pockets the blank teeth 5 on which the driving surfaces are to be formed. The wheel 2 is then centrally secured by such means as the clamps 6, to a table 7 rotatably mounted by means of its spindle 8.

A rotary cutting tool 9 of the same diameter as the loose bodies which may be driven by an electric motor 10 and flexible shaft 11 is mounted on an arm 12, pivoted on a fixed pin 13 so that the tool may be moved through an arc 14 equivalent to the path of the bodies along the transition guide by which the said bodies are fed into the rectilinear guide the pin 13 being at the center of this arcuate path. The axis 15 of the cutter is thus constrained to describe an arcuate path equivalent to the centre line of the moving bodies in the transition guide. The cutter is so mounted in the arm 12 that it may be lifted relative to said arm for the purpose of lowering it into the successive holes 3, without being moved laterally from the arm.

An arm 16, formed integral with the cutter arm 12 and equal in length thereto, carries a pivot pin 17 spaced from the cutter axis 15 by a distance equal to the diameter of the loose bodies. Connected to said pivot pin 17 by a link 18 is a further pivot pin 19 positioned on a slide 20, the pivot 19 being arranged to move along a path corresponding to that of the rectilinear guide by being mounted in fixed guides 21. The length of the link 18 is equal to the diameter of the loose bodies; so that the centres of the cutter 9, pivot 17 and pivot 19 thus represent the centres respectively of a loose body just leaving the wheel, a second being pushed by the first through the transition guide, and a third moving down the rectilinear guide and pushed by the second.

For the proper operation of the mechanism in which the loose bodies are circulated it is necessary for a body in the rectilinear guide to move at a uniform speed through a distance equal to its diameter, while a body in the wheel simultaneously moves uniformly through an angle A equal to the pitch of the pockets 3.

Referring to the present tooth forming mechanism this relative movement may be transmitted to the wheel 2 and pivot pin 19 representing the centre of a carrier in the rectilinear guide by means of a shaft 22, fitted with a hand wheel 23 and provided with worms 24, 25 the first worm 24 engaging teeth on the table 7 so as to move it through the angle A, while the second worm 25, through the gear wheel 26, pinion 27, and the rack 28 mounted on the slide 20, moves the pivot pin 19 simultaneously through a distance equal to the diameter of a loose body. For the purpose of moving the rack and cutter back to their original position after a tooth has been formed, there is provided a detachable clutch which may conveniently comprise a removable pin 29, passing through the pinion 27 into a member 30 secured to the shaft 31; the pinion 27 being loosely mounted on the end of said shaft. The pin holes in the pinion 27 and the member 30 are arranged to aline with one another when the slide is in either of its extreme positions. Notches 32 which are A degrees apart, may be provided on the periphery of the table 7 into which the spring stop 33 engages.

The operation for forming a tooth surface is as follows:—The mechanism is positioned as in Fig. I and the cutter set in motion. The stop 33 is withdrawn from the notch 32 and the hand wheel 23 is turned so as to rotate the table 7 in the direction of the arrow B and simultaneously to move the pivot 19 along its rectilinear path. When the notch 32 has cleared the stop 33, the stop may be released and allowed to run on the periphery of the table until it engages the next successive notch 32a, and the mechanism arrives at the position as shown in Fig. II when the complete tooth face 34 has been formed. The table 7 is left in this position, the pin 29 withdrawn, the cutter 9 is lifted as described above, and the slide 20 and cutter 9 are returned to the Fig. I position when their movement is arrested by the pins 35 engaging the guides 21. The cutter is then lowered into the next successive hole 3a, the pin 29 is replaced and the operation is repeated until all the tooth faces have been formed.

The apparatus described is suitable for the case in which the first two of the loose bodies in contact, counting from the driving wheel 2, are always both in the transition guide represented by 14. If this is not the case, the arm 16 is not made rigid with the arm 12 but is connected thereto by another link like the link 18.

I claim:
1. In a machine for the purpose described, a circular work table mounted to revolve on its center, a fixed bracket overhanging said table in spaced relation thereto, a guide formed on said bracket and extending diametrically over said table, a bell crank lever having two arms and pivoted to the bracket at the junction of its arms, one of said arms extending toward the periphery of the table and the other being inclined toward the guide, a slide in said guide reciprocable therein, a link connecting the last mentioned arm and slide, a revolving cutter carried by the first arm, and means to rotate the table and reciprocate the slide simultaneously.

2. In a machine for the purpose described, a circular work table mounted to revolve on its center, a fixed bracket overhanging said table in spaced relation thereto, a guide formed on said bracket and extending diametrically over said table, a bell crank lever having two arms and pivoted to the bracket at the junction of its arms, one of said arms extending toward the periphery of the table and the other being inclined toward the guide, a slide in said guide reciprocable therein, a link connecting the last mentioned arm and slide, a revolving cutter carried by the first arm, gearing connecting said table and slide and arranged to cause simultaneous rotation of the table and reciprocation of the slide.

3. In a machine for the purpose described, a circular work table mounted to revolve on its center, a fixed bracket overhanging said table in spaced relation thereto, a guide formed on said bracket and extending diametrically over said table, a bell crank lever having two arms and pivoted to the bracket at the junction of its arms, one of said arms extending toward the periphery of the table and the other being inclined toward the guide, a slide in said guide reciprocable therein, a link connecting the last mentioned arm and slide, a revolving cutter carried by the first arm, and means to rotate the table and reciprocate the slide simultaneously, the distances from the pivotal center of the lever to the centers of the cutter and the pivotal connection of the link and lever arm being each equal to the distance from the pivotal center of the lever and the center line of the guide.

4. In a machine for the purpose described a circular work table mounted to revolve on its center, a fixed bracket overhanging said table in spaced relation thereto, a guide formed on said bracket and extending diametrically over said table, a bell crank lever having two arms and pivoted to the bracket at the junction of its arms, one of said arms extending toward the periphery of the table and the other being inclined toward the guide, a slide in said guide reciprocable therein, a link connecting the last mentioned arm and slide, a revolving cutter carried by the first arm, gearing connecting said table and slide and arranged to cause simultaneous rotation of the table and reciprocation of the slide, the distances from the pivotal center of the lever to the centers of the cutter and the pivotal connection of the link and lever arm being each equal to the distance from the pivotal center of the lever and the center line of the guide.

In testimony whereof I have affixed my signature.

WESLEY ERNEST JOHN.